United States Patent [19]

Popov et al.

[11] 4,239,997
[45] Dec. 16, 1980

[54] LINEAR INDUCTION MOTOR

[76] Inventors: Alexandr D. Popov, pereulok Rynochny, 44; Vladimir A. Solomin, ulitsa Dachnaya, 14, kv. 31, both of Rostov-na-Donu; Vladimir A. Trofimov, selo Balakleya, pereulok Tikhy, 8, Cherkasskaya oblast; Vasily I. Bocharov, Novocherkassk, pereulok Knizhny, 5; Jury V. Kuprianov, Novocherkassk, ulitsa Svobody, 11, kv. 11, both of Rostovskaya oblast, all of U.S.S.R.

[21] Appl. No.: 962,783

[22] Filed: Nov. 21, 1978

[51] Int. Cl.³ .............................................. H02K 41/07
[52] U.S. Cl. ...................................................... 310/13
[58] Field of Search ...................................... 310/12–14

[56] References Cited

U.S. PATENT DOCUMENTS

| Re. 28,161 | 9/1974 | Bolton et al. | 310/13 |
| 3,644,762 | 2/1972 | Eastham | 310/13 |
| 3,770,995 | 11/1973 | Eastham et al. | 310/13 |
| 3,836,799 | 9/1974 | Eastham et al. | 310/13 |
| 3,958,138 | 5/1976 | Eastham et al. | 310/13 |

Primary Examiner—Donovan F. Duggan
Attorney, Agent, or Firm—Steinberg & Raskin

[57] ABSTRACT

A linear induction motor comprises an inductor made of one row of main U-shaped transversely laminated cores and not more than two rows of such additional cores which are enveloped by a main polyphase distributed winding and an additional polyphase distributed winding, respectively, and a secondary element interacting with the inductor. The secondary element is provided with an electrically conductive part placed upon a magnetically conductive base. Legs of the main and additional U-shaped cores alternate and adjoin one another forming two toothless active zones through which the secondary element interacts with the inductor.

3 Claims, 2 Drawing Figures

LINEAR INDUCTION MOTOR

FIELD OF INVENTION

The invention relates to electrical machines and, in particular, to linear induction motors.

The present invention can be employed in transport, conveyer lines, as well as in other electric drives characterized by linear or reciprocating motion of actuators.

The present invention can be most effectively utilized in high-speed ground vehicles suspended magnetically or by air cushion.

A more effective interaction of the inductor of a linear induction motor with a secondary element, which produces the thrust force, is achieved through a purely sinusoidal distribution of the magnetizing force in the direction of movement.

DESCRIPTION OF THE PRIOR ART

There is known a linear induction motor (cf. British Pat. No. 1,373,054, Cl. H2A, filed 1974) comprising an inductor made of separate U-shaped cores enveloped by a concentrated polyphase winding and a secondary element. The magnetic flux of the inductor of the known motor closes in the direction perpendicular to the direction of the inductor movement and the thrust force is produced due to the existing travelling magnetic field. However, the distribution of the magnetizing force in the known motor in the longitudinal direction differs significantly from a sinusoidal distribution.

There is also known a linear induction motor (cf., for example, B. M. Eisenstein "Linear Motors", VINITI Publishers, Moscow, 1975, p. 61, /in Russian/) comprising an inductor composed of a row of main U-shaped transversely laminated cores enveloped by a main distributed polyphase winding and a secondary element interacting with the inductor and having an electrically conductive part placed on a magnetically conductive base.

The inductor of this known motor is designed in such a way that the cores are arranged in a row spaced somewhat from one another by air gaps. In this case a toothed active zone is formed, which results in non-sinusoidal distribution of the magnetizing force in the direction of the inductor movement. This adversely affects the thrust characteristics of the known motor.

SUMMARY OF THE INVENTION

It is an object of the present invention to increase the thrust force generated by a linear induction motor.

This is achieved in that in a linear induction motor comprising an inductor made of a row of main U-shaped transversely laminated cores enveloped by a main distributed polyphase winding and a secondary element interacting with the inductor and having an electrically conductive part placed on a magnetically conductive base, according to the invention, the inductor is provided with no more than two rows of additional U-shaped transversely laminated cores enveloped by an additional distributed polyphase winding and arranged between the main U-shaped cores so that the legs of the main and additional U-shaped cores alternate and adjoin one another forming two toothless active zones through which the secondary element interacts with the inductor.

It is advisable that in the linear induction motor, if only one row of additional U-shaped cores is used, said cores be higher as compared to the main U-shaped cores and arranged in one row therewith.

Another embodiment of the invention resides in that, if two rows of additional U-shaped cores are used, said cores are of the same height as the main U-shaped cores and arranged on both sides of the row of the main U-shaped cores.

The proposed linear induction motor is simple to manufacture, has more thrust and is more efficient than conventional motors of this type. The design of the motor permits easy repair of any inductor part.

BRIEF DESCRIPTION OF THE DRAWINGS

The invention will now be described in greater detail with reference to preferred embodiments thereof taken in conjunction with the accompanying drawings, wherein.

DETAILED DESCRIPTION OF THE INVENTION

Figure 1:
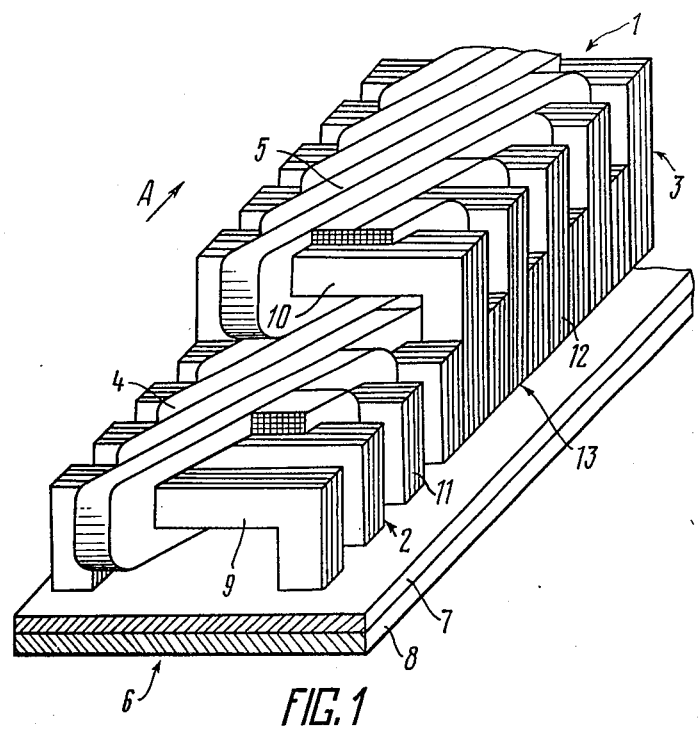
FIG. 1 is a perspective view of a linear induction motor provided with additional U-shaped cores arranged in one row, according to the invention.

Consider the use of a linear induction motor for high-speed ground vehicles.

A linear induction motor comprises an inductor 1 (FIG. 1) composed of a row of main U-shaped transversely laminated cores 2 and additional U-shaped transversely laminated cores 3 enveloped respectively by a main distributed polyphase winding 4 and an additional distributed polyphase winding 5 and a secondary element 6 interacting with the inductor 1 and having an electrically conductive part 7 placed upon a magnetically conductive base 8.

Each main core 2 and each additional core 3 have, respectively, yokes 9 and 10 and two legs 11 and 12. For better understanding of the invention FIG. 1 illustrates a linear induction motor wherein some of the additional U-shaped cores are not shown. The additional U-shaped cores 3 are generally higher as compared to the main U-shaped cores 2 i.e., legs 12 are of greater length than legs 11, and are arranged in the same row therewith. The legs 11 and 12 of the respective main cores 2 and the additional cores 3 alternate and adjoin one another forming two toothless active zones 13 through which the secondary element 6 interacts with the inductor 1. The height of the additional U-shaped cores 3 is selected so that the main windings 4 and the additional windings 5 and the insulation therebetween (not shown in the drawings) can be fitted therein.

The main and additional U-shaped cores 2 and 3 are made of electrical steel, whereas the windings 4 and 5 of the main and additional cores 2 and 3 are made of copper. Aluminum is used as the material for the electrically conductive part 7 of the secondary element 6, but copper can be also used as well as other materials with high electric conductivity. The magnetically conductive base 8 is made of machine steel, but in some cases electrical steels with improved magnetic properties can be used.

Figure 2:
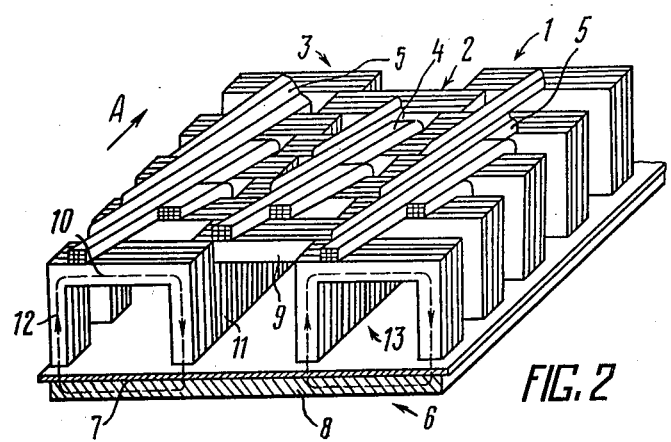
FIG. 2 is a perspective view of the same motor provided with additional U-shaped cores arranged in two rows, according to the invention.

Referring to FIG. 2, an embodiment of a linear induction motor comprises the inductor 1 made of one row of main U-shaped cores 2 and two rows of additional U-shaped cores 3 which are of the same height as the main U-shaped cores 2 and arranged on both sides of the row of the main U-shaped cores 2. However, if the motor power has to be increased without altering its length, the number of rows of the main cores 2 may be greater. The legs 11 and 12 of respective main cores 2 and additional cores 3 alternate and form two toothless active zones 13.

The linear induction motor operates as follows.

As the main and additional windings 4 and 5 (FIG. 1) are connected to a three-phase AC voltage source (not shown), currents flowing therethrough form a magnetizing force which produces in the toothless active zones 13 a traveling magnetic field which is sinusoidally distributed in the direction of movement. The travelling magnetic field induces electromotive forces and currents in the electrically conductive part 7 of the secondary element 6. Currents interact with the traveling magnetic field and produce forces directed along the secondary element 6. Due to these forces the inductor 1 moves in the direction opposite to the direction of the traveling magnetic field (indicated by the arrow in the drawing).

The linear induction motor of FIG. 2 operates similarly. The presence of toothed active zones formed by the legs 12 of the rows of additional cores 3 which do not alternate with the main cores 2 produces additional forces in the direction of the movement and contributes to better thrust characteristics of the motor.

The fact that the distribution curve of the traveling magnetic field in the direction of the movement is significantly closer to a sinusoid makes the thrust forces of the proposed motor much greater as compared to the known ones. Greater thrust means more efficient operation of the motor itself.

What is claimed is:

1. A linear induction motor comprising an inductor including:
   one row of first U-shaped transversely laminated cores, each first core having legs and a connecting yoke;
   a first distributed polyphase winding enveloping said row of first U-shaped transversely laminated cores;
   at least one but not more than two rows of second U-shaped transversely laminated cores, each second core having legs and a connecting yoke, one leg of each said second cores being arranged between respective legs of two of said first U-shaped transversely laminated cores;
   a second distributed polyphase winding enveloping each row of the second U-shaped transversely laminated cores;
   two toothless active zones defined by alternating and adjoining legs of said first and second U-shaped transversely laminated cores;
   a secondary element interacting through said toothless active zones with said inductor; said secondary element including
   a magnetically conductive base and
   an electrically conductive part arranged upon said magnetically conductive base.

2. A linear induction motor as claimed in claim 1, comprising a single row of second U-shaped transversely laminated cores which are higher than the first U-shaped cores, said single row being arranged in said one row of first cores.

3. A linear induction motor comprising:
   one row of first U-shaped transversely laminated cores of an inductor, having first and second sides;
   one row of second U-shaped cores having the same height as the first U-shaped cores and arranged along the first and second sides of the row of the first U-shaped cores;
   a second row of second U-shaped cores having the same height as the first U-shaped cores and arranged along the second side of the row of the first U-shaped cores.

* * * * *